United States Patent [19]

Boccon-Gibod

[11] Patent Number: 5,426,775
[45] Date of Patent: Jun. 20, 1995

[54] METHOD AND A DEVICE FOR BOOTING A COMPUTER AT A PROGRAMMED TIME

[75] Inventor: Philippe Boccon-Gibod, Eybens, France

[73] Assignee: Hewlett-Packard Company, Palo Alto, Calif.

[21] Appl. No.: 49,288

[22] Filed: Apr. 20, 1993

[30] Foreign Application Priority Data

May 25, 1992 [FR] France ................... 92 06659

[51] Int. Cl.⁶ ............................................ G06F 9/445
[52] U.S. Cl. ................................. 395/575; 364/145
[58] Field of Search ............. 395/575, 550, 700, 750; 364/280.2, 280.3, 280.9, 145, 273.2, 271.5

[56] References Cited

U.S. PATENT DOCUMENTS

| | | | |
|---|---|---|---|
| 5,218,708 | 6/1993 | Kanbayashi | 395/800 |
| 5,247,655 | 9/1993 | Khan | 395/550 |
| 5,261,104 | 11/1993 | Bertram | 395/700 |
| 5,274,816 | 12/1993 | Oka | 395/700 |
| 5,280,627 | 1/1994 | Flaherty | 395/700 |
| 5,283,792 | 2/1994 | Davies, Jr. | 371/66 |
| 5,291,416 | 3/1994 | Hutchins | 364/474.16 |
| 5,307,497 | 4/1994 | Feigenbaum | 395/700 |

FOREIGN PATENT DOCUMENTS

0426909A1  5/1991  European Pat. Off. .
0474578A1  3/1992  European Pat. Off. .

OTHER PUBLICATIONS

"Asic Design Considerations for Power Management in Laptop Computers" by Yvon A. Dubois May 27–31, 1991, Euro Asic 91, pp. 348–351.

Wong, A., "Automatic Bootstrap," *Vax Professional*, Jun. 1987, vol. 9, No. 3, pp. 45–46.

"Control of Initial Program Load from Diskette," *IBM Technical Disclosure Bulletin*, vol. 34, No. 2, Jul. 1991, p. 389.

*Primary Examiner*—Jack B. Harvey
*Assistant Examiner*—Paul R. Myers

[57] ABSTRACT

A booting method for a microcomputer consists in executing a Power On Self Test program, loading an operating system and executing at least one current startup file including user-selected programs. The method comprises the steps of (a) storing in a non-volatile register, accessible through a bus of the microcomputer, a programmed time associated with a pending task; (b) detecting the coincidence between the time indicated by a permanently powered clock and the programmed time, and powering-on the microcomputer; and (c) executing, instead of at least one current startup file, at least one startup file associated with the pending task.

8 Claims, 7 Drawing Sheets

METHOD AND A DEVICE FOR BOOTING A COMPUTER AT A PROGRAMMED TIME

BACKGROUND OF THE INVENTION

1. Field of the Invention

The present invention relates to methods for booting a computer, more particularly a computer with a monotask operating system.

2. Discussion of the Related Art

Microcomputers are increasingly used; they can be used with various types of operating systems. The most widespread operating system, for which most of the softwares has been developed, is DOS (Disc Operating System).

There are so-called "multitask" operating systems that allow for simultaneously executing programs and sharing resources, such as the microcomputer's memory, the hard disc, and so forth. The drawback of DOS is that it is monotask, that is, it only allows the execution of one program at a time, all the sharable resources being then assigned to this program only.

Many DOS-operated microcomputers can be connected to a network serviced by a server. The server is generally provided with expensive peripheral devices (plotter, laser printer . . .) that can be used by all the microcomputers connected to the network. The server is also provided with a large-size mass storage device capable of storing a large amount of information and softwares. A microcomputer connected to the network can have its own mass storage device (hard disc) in which a user stores only the programs of the server that he most frequently needs.

In companies where many microcomputers are used, it is often necessary to update information or programs on the microcomputer's hard disc. Updating is too complex a task for an average user; so, an expert has to update each microcomputer through the network or from floppy disks, which is a time consuming and tedious task.

Further, a user often needs to carry out periodical security tasks, such as backups of the hard disc or checking whether viruses are present. Such operations are often time consuming, so the user is inclined to carry out these operations less often than required and thus risks data loss.

If a microcomputer connected to the network uses a multitask operating system, the server can perform updating operations when the microcomputer is on, even when a person is using it. It would even be possible, in that case, to make the server carry out determined tasks in the microcomputer, such as security tasks. However, it is not possible, presently, to make the server execute, at any time, tasks in a microcomputer using a monotask operating system, more particularly if a person is using the microcomputer.

The monotask operating systems have other drawbacks that will appear hereinafter.

When booting a DOS-operated microcomputer, for example, a predetermined number of so-called Terminate and Stay Resident (TSR) programs are loaded in memory. The TSR's to be loaded are listed in startup files referred to as CONFIG.SYS and AUTOEXEC.BAT, locally stored, for example on a hard disc, or provided by a server. A TSR is executed at specific events (a program being executed is then interrupted). Those specific events can be the striking of a determined sequence of keys, moving a mouse, transmitting data from or to a peripheral device . . .

Amongst the various TSR's, there are programs referred to as "drivers" that should necessarily be installed if it is desired to use an associated peripheral device. The role of the driver is generally to intercept and translate the information flowing between a peripheral device and the microcomputer. For example, when keys are pressed, a keyboard driver translates the codes provided by the keyboard into standardized codes corresponding to symbols marked on the keys.

The loaded TSR's occupy memory which, frequently, can be freed only by rebooting the microcomputer. Sometimes, the installation of TSR's leaves insufficient memory to certain programs. Additionally, TSR's may happen to be incompatible one with respect to another and with certain programs. More particularly, the use of a tape backup device is incompatible with some TSR's often installed in a microcomputer.

When such a problem of compatibility with installed TSR's is encountered, it is necessary to cancel the TSR's in the startup file and to reboot the microcomputer. To restore the initial conditions, the cancelled TSR's should be added back in the startup file and the microcomputer rebooted again. If those operations are to be executed each time a security task is to be carried out, especially the hard disc backup, one is also inclined not to carry out this security task as often as necessary.

An object of the invention is to enable the execution of tasks in an initially powered-off computer.

Another object of the invention is to enable a server to operate an initially powered-off computer.

SUMMARY OF THE INVENTION

The invention achieves these objects by providing, about a permanently powered Real Time Clock (RTC), conventionally present in microcomputers, registers accessible by the microcomputer and a power control circuit coupled to specific ones of those registers. The role of the control circuit is to activate, depending on the state of the specific registers, a power supply block of the microcomputer.

In a programmed time register is stored a time at which a task has to be carried out. The microcomputer being initially switched off, when the RTC indicates the programmed time, the control circuit powers-on the microcomputer. If the operating system has to be loaded from the network, an adequate boot-up program, executed before loading the operating system, sends through the network a load request by indicating a startup file associated with the programmed task. Then, the network provides the operating system and the startup file.

If the operating system is locally loaded, a default startup file is executed. In this startup file, an adequate program replaces the current startup file by a startup file associated with the programmed task and causes the microcomputer to reboot. Then, the startup file corresponding to the programmed task is executed. In this startup file, there is listed a program which, at its end, restores the default startup file.

The invention more particularly applies to a booting method for a microcomputer consisting in executing a test program, loading an operating system and executing at least one current startup file including user-selected programs. According to the invention, the method further comprises the following steps: (a) storing in a non-volatile volatile register, accessible through a bus of the microcomputer, a programmed time associated with a pending task; (b) detecting the coincidence between the time indicated by a permanently powered clock and the programmed time, and powering-on the microcomputer; and (c) executing, instead of at least one current startup file, at least one startup file associated with the pending task.

According to an embodiment of the invention, the booting method comprises the following steps: setting a non-volatile task pending bit accessible through the bus and signalling that a corresponding task is pending when the time indicated by the clock reaches the programmed time; detecting the active state of the task pending bit, and powering-on the microcomputer; and resetting the task pending bit as soon as the task is completed.

According to an embodiment of the invention, the booting method comprises the following steps: storing in a non-volatile file number register accessible through the bus, a number of the startup file associated with the pending task; storing in a non-volatile network boot bit, accessible through the bus, a value indicating whether, for the pending task, the operating system should be loaded through the network; if the network boot bit is set, sending through the network a load request, passing as a parameter the startup file number associated with the pending task, a server then providing the microcomputer with an operating system and a startup file, both associated with the startup file number; and, if the network boot bit is not set, loading an operating system from a local media.

According to an embodiment of the invention, if the network boot bit is not set, the method comprises the following steps: replacing, on the local media, the current startup file with a startup file associated with the startup file number; booting the microcomputer again, whereby the startup file associated with the startup file number is executed; and restoring the initial startup file.

According to an embodiment of the invention, the booting method comprises the following steps carried out by a modified Power On Self Test program: checking whether the microcomputer has been manually powered and, if not, continuing according to the following steps; writing in an identification register accessible through the bus an information indicating that a task is pending; and loading the operating system through the network or from a local media, in accordance with the state of the network boot bit.

According to an embodiment of the invention, the booting method comprises the following steps carried out by a default startup file on a local media: reading the identification register; if the identification register indicates a pending task, replacing the current startup file with a startup file associated with the pending task and warm booting the microcomputer.

According to an embodiment of the invention, the booting method comprises the following steps carried out by a startup file, different from the default startup file, provided by the network: executing user-elected programs; initializing the identification register; and resetting the task pending bit.

According to an embodiment of the invention, the booting method comprises the following steps carried out by a startup file loaded through a local media, different from the default startup file: executing user-elected programs; restoring the default startup file; initializing the identification register; and resetting the task pending bit.

The invention is also related to a microcomputer including a permanently powered Real Time Clock (RTC) and a power supply block that is controlled by a logic signal. According to the invention, the microcomputer includes: a first set of non-volatile registers accessible through a bus of the microcomputer, including a task pending register, each bit of which indicates whether a corresponding task is pending or not; a set of non-volatile registers specific to each pending task and accessible through the bus, each specific register set including a specific startup file number register and a register storing the programmed time of the task; means for comparing the content of the programmed time registers with the time indicated by the RTC and for setting a task pending bit if the RTC time reaches a corresponding programmed time; and means for detecting the set state of any one of the task pending bits and for then powering-on the microcomputer.

According to an embodiment of the invention, the first register set includes a current startup file number register in which, each time the microcomputer is powered-on by a pending task, is written the number of the specific startup file associated with the pending task, and each specific register set includes a network boot bit indicating whether an operating system should, for the associated task, be loaded through a network or from a local media.

The foregoing and other objects, features, aspects and advantages of the invention will become apparent from the following detailed description of the present invention which should be read in conjunction with the accompanying drawings.

Before describing the invention, a conventional data processing system, as well as a conventional microcomputer boot process, will be described.

Figure 1:
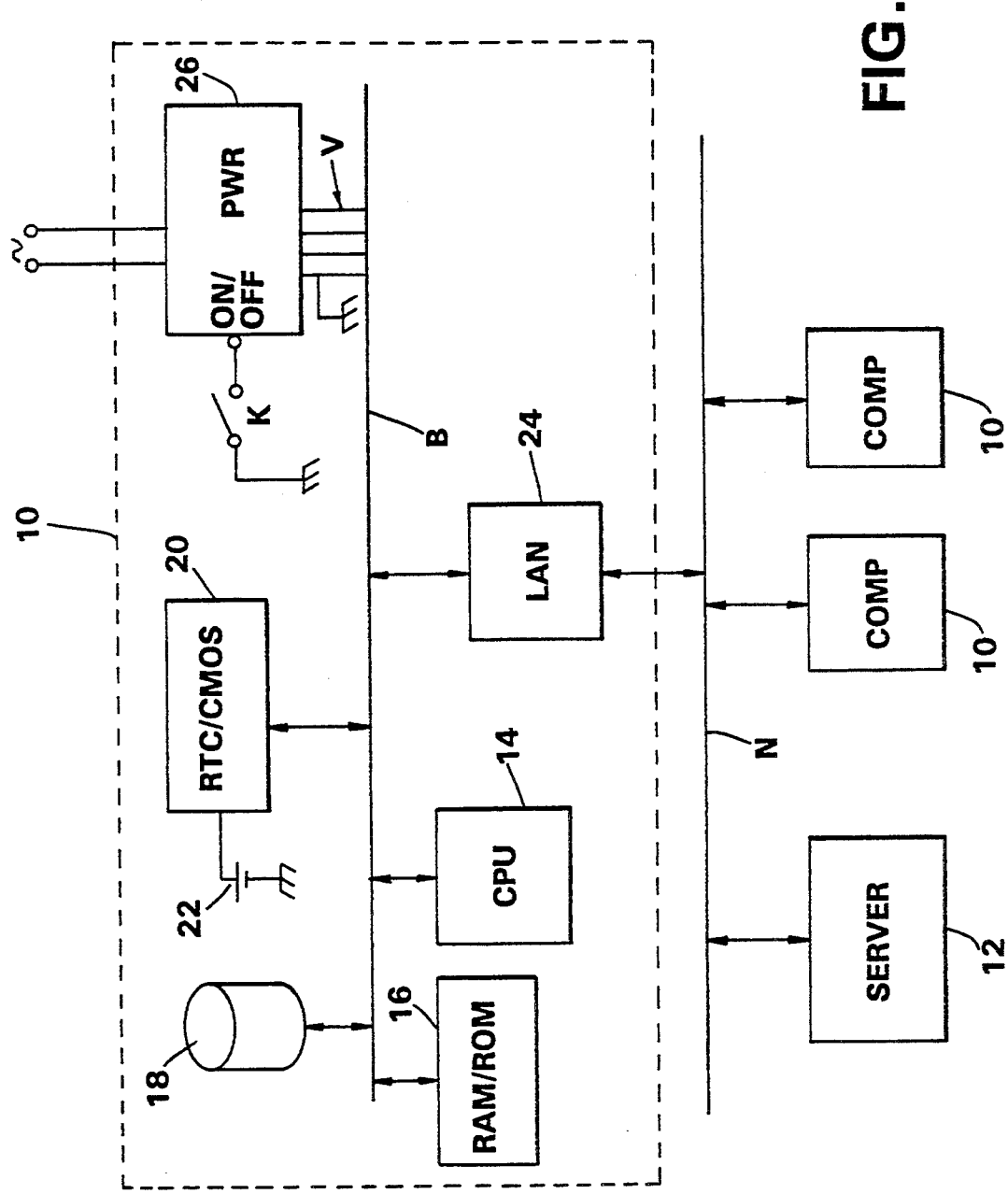
FIG. 1 schematically shows microcomputers connected to a network as well as some elements of a conventional microcomputer.

In FIG. 1, microcomputers (COMP) 10 are connected to a network N serviced by a server 12. Inside a rectangle drawn in dashed lines, elements of a conventional microcomputer 10 are represented. A bus B interconnects a Central Processing Unit (CPU) 14, a memory 16 including Random Access Memory (RAM) and Read Only Memory (ROM), a mass storage device 18 such as a hard disc and/or floppy disc, and a circuit 20 including a Real Time Clock (RTC) and a volatile memory (CMOS). A battery 22 permanently powers circuit 20. Bus B is connected to network N through an interface circuit (LAN) 24. Bus B further includes power supply lines V connected to a power supply block (PWR) 26 connected to the mains. In recent computers, the power block 26 includes an ON/OFF control input connected to ground through a manual switch K. Input ON/OFF is sensitive to low voltage logic levels (ranging from 0 to 5 volts).

Figure 2:
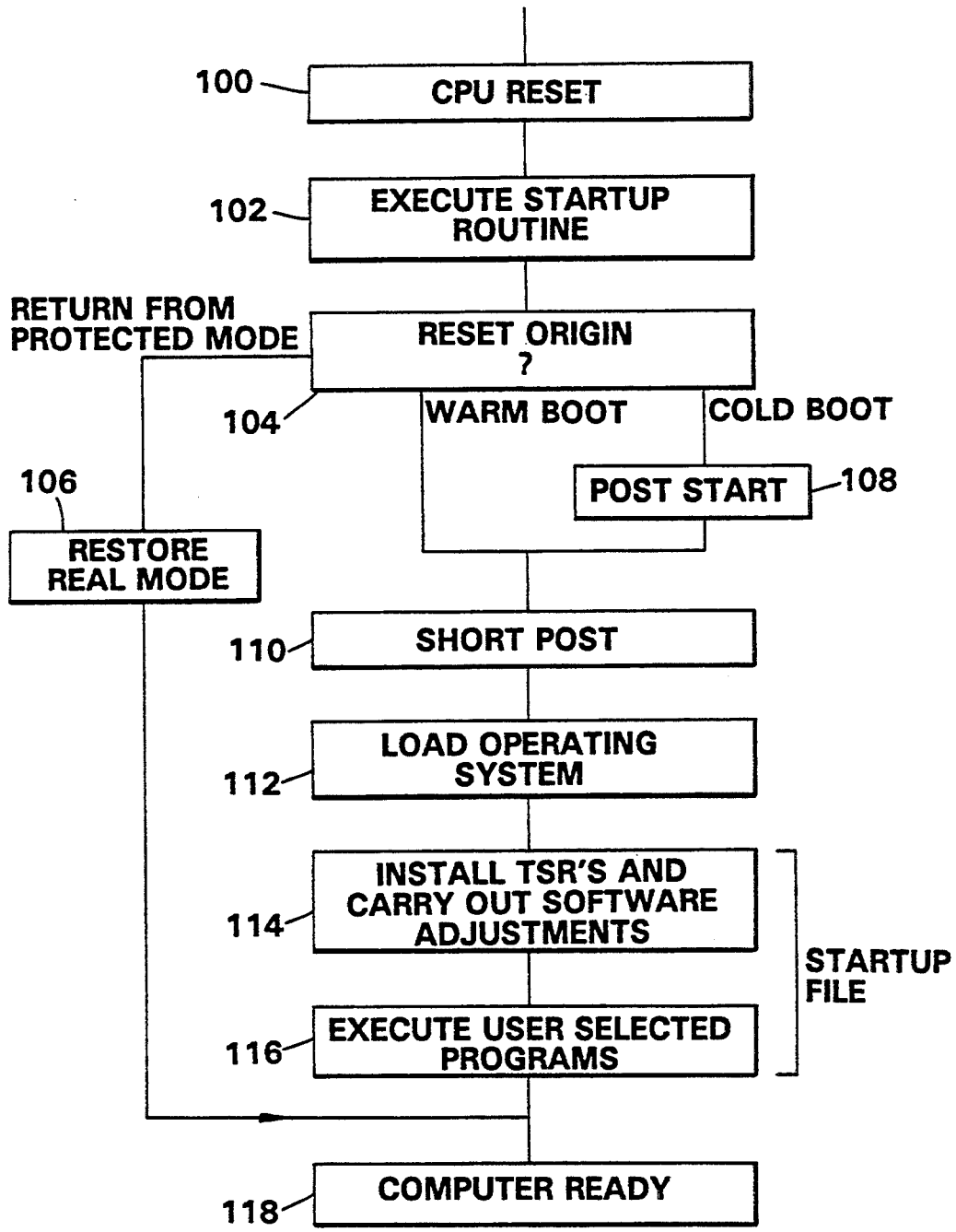
FIG. 2 is a flow-chart of a conventional boot process.

FIG. 2 is a flow-chart of the operations executed during a conventional boot process of a computer. The entering in the flow-chart can have three different origins. A first origin is the powering-on of the microcomputer, referred to as cold boot. A second origin is a so-called warm boot that consists in rebooting the microcomputer while it remains powered. Such a warm boot occurs when a specific button is pressed or when a specific sequence on the keyboard is struck. The third origin is a so-called return from protected mode. The microprocessor in a DOS-operated microcomputer has two operation modes: one, referred to as real mode, is where the microprocessor can only access the first 1-megabyte block of the memory, and the other, referred to as protected mode, is where the microprocessor can access as much memory as allowed by its address bus. Transition from protected mode to real mode is obtained by resetting the microprocessor.

Hereinafter, paragraphs describing a flow-chart block are preceded by the block number.

100. The microprocessor is reset.

102. As soon as the microprocessor is reset, a boot routine, stored in ROM, is executed. The boot routine determines the origin of the microprocessor's reset.

104. Depending on the origin of the reset, control goes to block 106, 108 or 110.

106. The origin of the reset is a return from protected mode. The real mode is restored and control returns to block 118, where the microcomputer is ready to be used again.

108. The origin of the reset is a cold boot. A first portion of a so-called Power On Self Test (POST) program is executed. The POST carries out various tests such as checking the RAM.

110. The first portion of the POST is completed or the origin of the reset is a warm boot. A second portion of the POST (short POST) is executed. The operations carried out by the short POST are detailed in the flow-chart of FIG. 3.

112. The operating system is loaded. Depending on what has been determined by the short POST in block 110, the operating system is loaded, either locally from a hard disc or floppy disk 18, or through the network. Generally, the short POST checks whether the floppy disc is present. If the floppy disc is present, an attempt is made to load the operating system from the latter (priority is given to loading from the floppy disc); otherwise, the operating system is loaded from the hard disc. Should these two attempts fail, loading is done from the server (if the microcomputer is connected to one).

114. TSR's are loaded in memory and various software adjustments are carried out. Software adjustments are useful for adapting the operating system to the user's need and/or to the requirement of some programs.

116. Programs selected by a user, to be launched at the microcomputer's boot-up, are executed.

The TSR's to be loaded, the software adjustments to be carried out and the programs to be launched are listed in a startup file. As soon as it is loaded, the operating system searches the startup file on a boot media (hard disc or floppy disc) or through the network. The startup file of DOS is divided into two files: a so-called CONFIG.SYS file in which essentially drivers are listed, and a so-called AUTOEXEC.BAT file in which essentially user-selected programs to be launched at boot-up are listed. The operations carried out in blocks 114 and 116 will be referred to hereinafter as "execution of the startup file".

118. When the user-selected programs are executed in block 116 or if the real mode has been restored after a return from protected mode, the microcomputer is ready for use.

Figure 3:
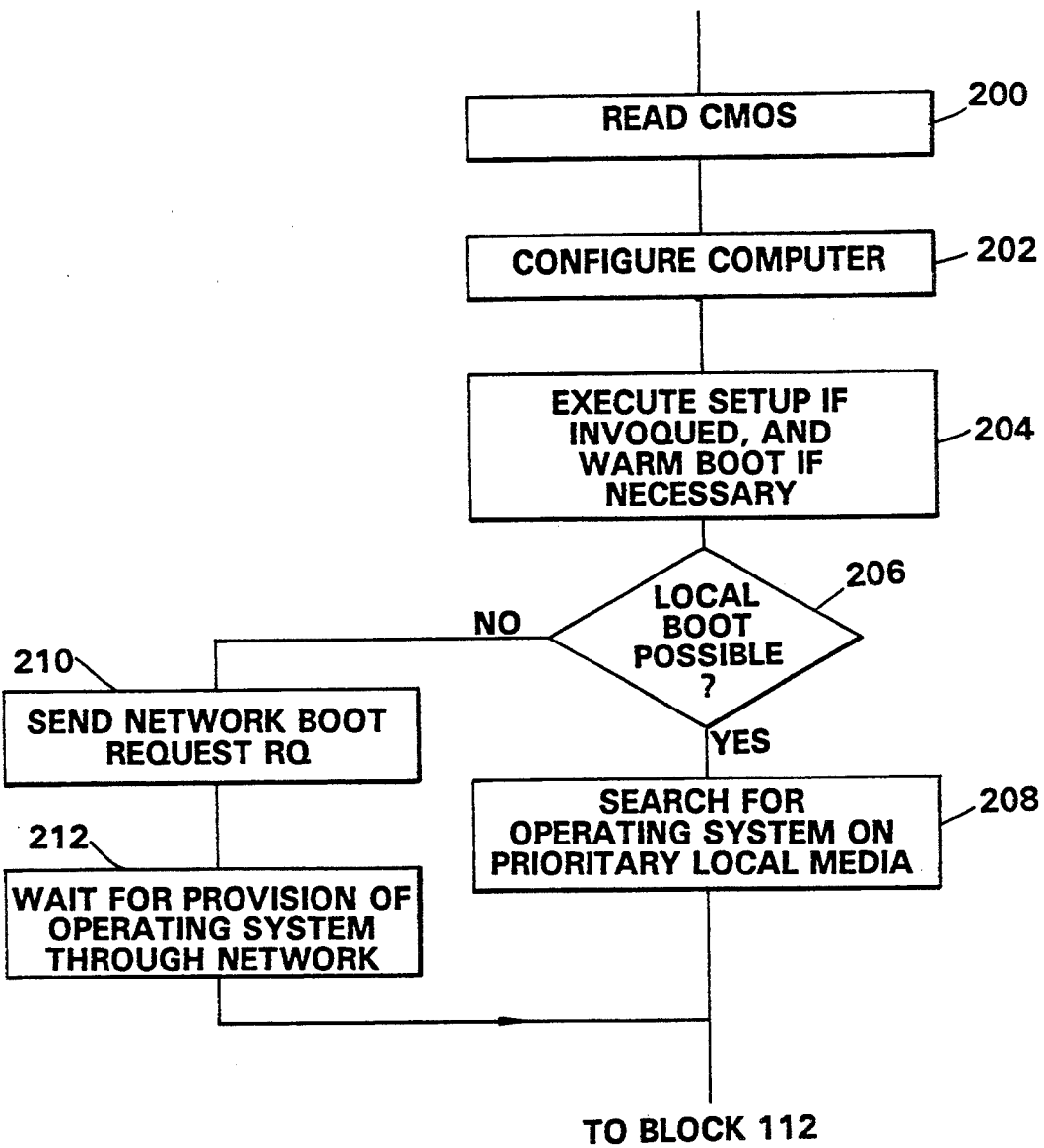
FIG. 3 is a flow-chart of operations carried out at the end of the execution of a test program in FIG. 2.

FIG. 3 shows a flow-chart of the last operations carried out by the short POST in block 110.

200. The content of CMOS memory 20 is read. Data (hereinafter "configuration" data) are stored in the CMOS memory, for carrying out material adjustments of the microcomputer. For example, in the CMOS memory, is stored the size of the installed RAM, the types and capacities of the hard disc and floppy disc drives, the speed of the CPU clock, and so forth.

202. The microcomputer is configured according to the configuration data read in the CMOS memory. It is also checked whether a floppy disc is provided in the disc drive and whether the hard disc is present.

204. If the user strikes a specific sequence of keys during the boot process, a so-called SETUP program, stored in ROM, is executed. The SETUP program allows the user to modify the configuration data stored in the CMOS memory. If the user modifies the configuration data, the SETUP program reboots the microcomputer so that the latter is adjusted in accordance with the new configuration data. If no modifications are made, operations continue as hereunder.

206. It is checked whether a local loading of the operating system is possible (a local media such as a floppy disc and/or a hard disc has been detected).

208. Local loading is possible. The short POST searches the operating system on the local media.

210. Local loading is impossible. The short POST sends through the network a boot request RQ. Request RQ provides as a parameter to the network's server a so-called Media Access Control (MAC) address, specific to the microcomputer, enabling the server to identify the microcomputer that requests loading of the operating system.

212. The microcomputer waits for the provision through the network of the operating system and the startup file.

Once the operating system is found in block 208 or provided in block 212, the boot process continues normally at block 112 of FIG. 2 where the operating system is loaded.

DESCRIPTION OF THE PREFERRED EMBODIMENTS OF THE INVENTION

The invention is implemented, according to an embodiment, by modifying the RTC/CMOS memory circuit 20 of FIG. 1 and the short POST program.

Figure 4:
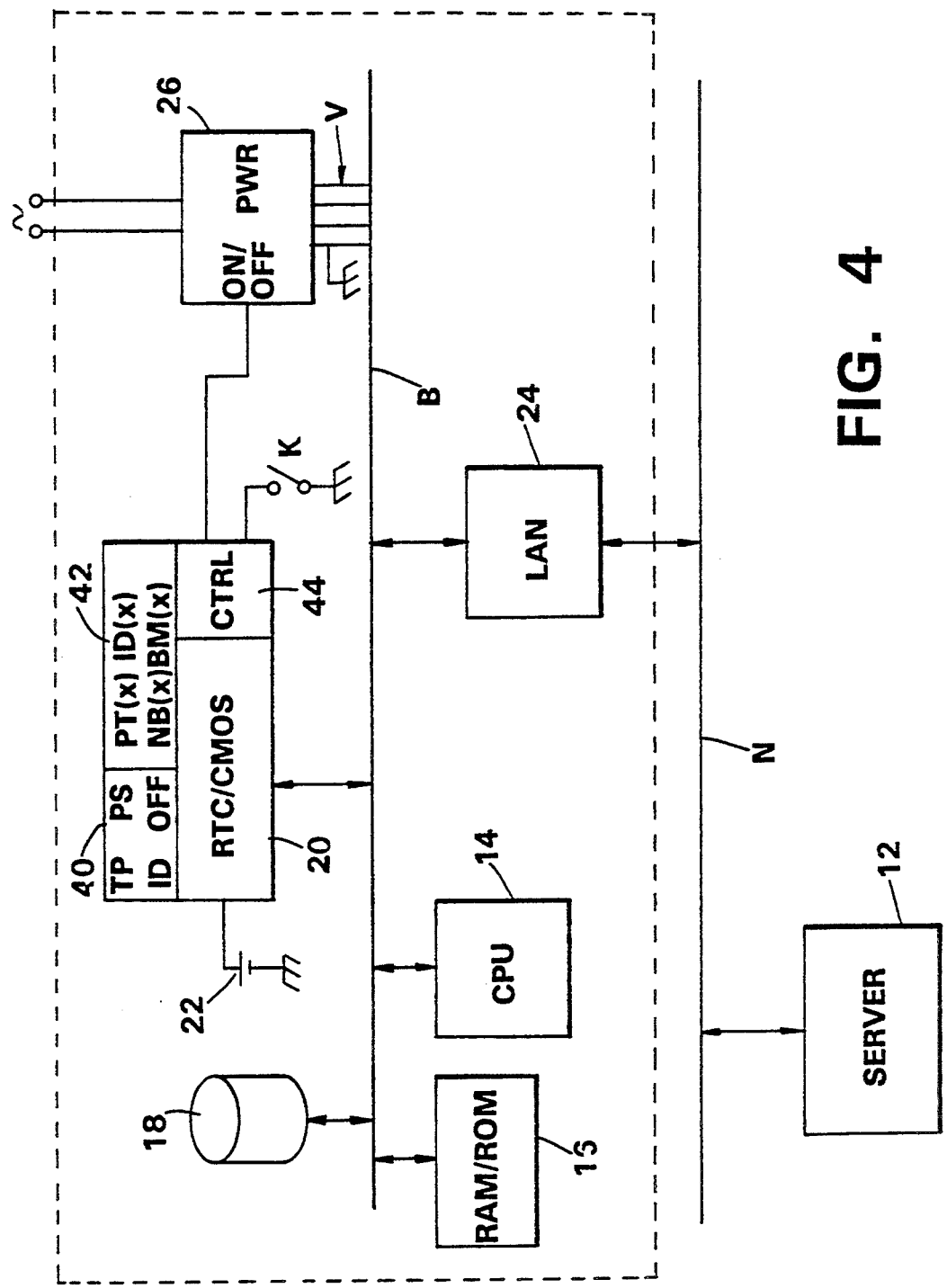
FIG. 4 illustrates elements of a microcomputer according to an embodiment of the invention.

FIG. 4 schematically represents elements of a microcomputer including an RTC/CMOS memory circuit 20 modified according to the invention. In FIG. 4, same elements as in FIG. 1 are designated by same reference numerals.

According to the invention, a first set of registers 40 that is common to a set of pending tasks is associated to the RTC/CMOS memory circuit 20. Register set 40 includes a task pending register TP and an ID register storing the number of the current startup file.

Each bit $TP_x$ of the TP register determines whether a corresponding task x is pending or not. To each task x is associated a set of specific registers 42 including a programmed time register PT(x) for task x, a register ID(x) storing the number of the startup file associated with task x, and a network boot bit NB(x).

Register ID(x) associates to task x a startup file selected among several possible startup files on a local media and/or in the server. In the startup file associated with a number ID(x) are listed specific programs for carrying out various desired tasks, such as backing up the hard disc, checking the absence of viruses, and so forth. One of the startup files is a default startup file (having number 0) that provides the user with his usual environment when a pending task is not being executed.

The role of the registers or bits TP, ID, PT(x), ID(x), NB(x), and others, is described in more detail hereinafter. The following table indicates the abbreviations used for the bits and registers as well as their role.

| | |
|---|---|
| TP (Tasks Pending) | register indicating the presence of pending tasks |
| ID | register identifying the current task |
| PS (Power Switch) | bit indicating an action on the power switch |
| OFF | power-off bit (volatile) |
| PT(x) (Programmed Time) | register indicating the programmed time of a task x |
| ID(x) | register identifying a startup file (list of subtasks) associated with task x |
| NB(x) (Network Boot) | bit indicating, for task x, that the operating system is to be loaded through the network |
| BM(x) (Boot Media) | bit indicating, for task x, on which local media the operating system is to be loaded |

A control circuit 44, to which is connected a push-button K for manually powering-on the microcomputer, is also associated with the RTC/CMOS memory circuit 20. Control circuit 44 directly drives the ON/OFF control input of the power supply block 26.

In the set of registers 40, common to the pending tasks, the state of a bit PS is toggled at each action on the push-button K, and a volatile bit OFF can be set in order to power-off the microcomputer (bit OFF is reset as soon as the microcomputer is off).

Each register or bit of the register sets 40 and 42 is accessible in the same way as the CMOS memory. The CMOS memory is accessible according to a so-called indexed mode, that is, in order to access a location of the CMOS memory, the location address is first written at a first fixed specific address, and data to be transferred between the location and the microcomputer are read or written at a second fixed specific address. With DOS operated microcomputers, these specific addresses are 070h and 071h. In general, a large number of location addresses in the CMOS memory are available; they are used to address the additional registers and bits 40, 42.

The control circuit 44 and the register sets 40, 42 are also powered by battery 22 and are therefore operative even when the microcomputer is off.

The control circuit 44 is designed to meet, for example, the following requirements:
 comparing the content of each programmed time register PT(x) with the time indicated by the RTC;
 if the times are equal, setting to 1 the associated bit $TP_x$ of the task pending register TP;
 comparing the content of register TP with zero and, if the content is non zero, providing an active state to the ON/OFF control input of the power supply block 26 (switch the microcomputer on);
 if the OFF bit is set, providing an inactive state to the ON/OFF input (switch the microcomputer off);
 providing an active state to the ON/OFF input when bit PS is set, and an inactive state when bit PS is reset; and
 toggling the state of bit PS upon each action on the push-button K, and resetting bit PS when bit OFF is set.

The functions of circuit 44 can be easily achieved by those skilled in the art by using logic gates, flip-flops, binary comparators . . .

Figure 5:
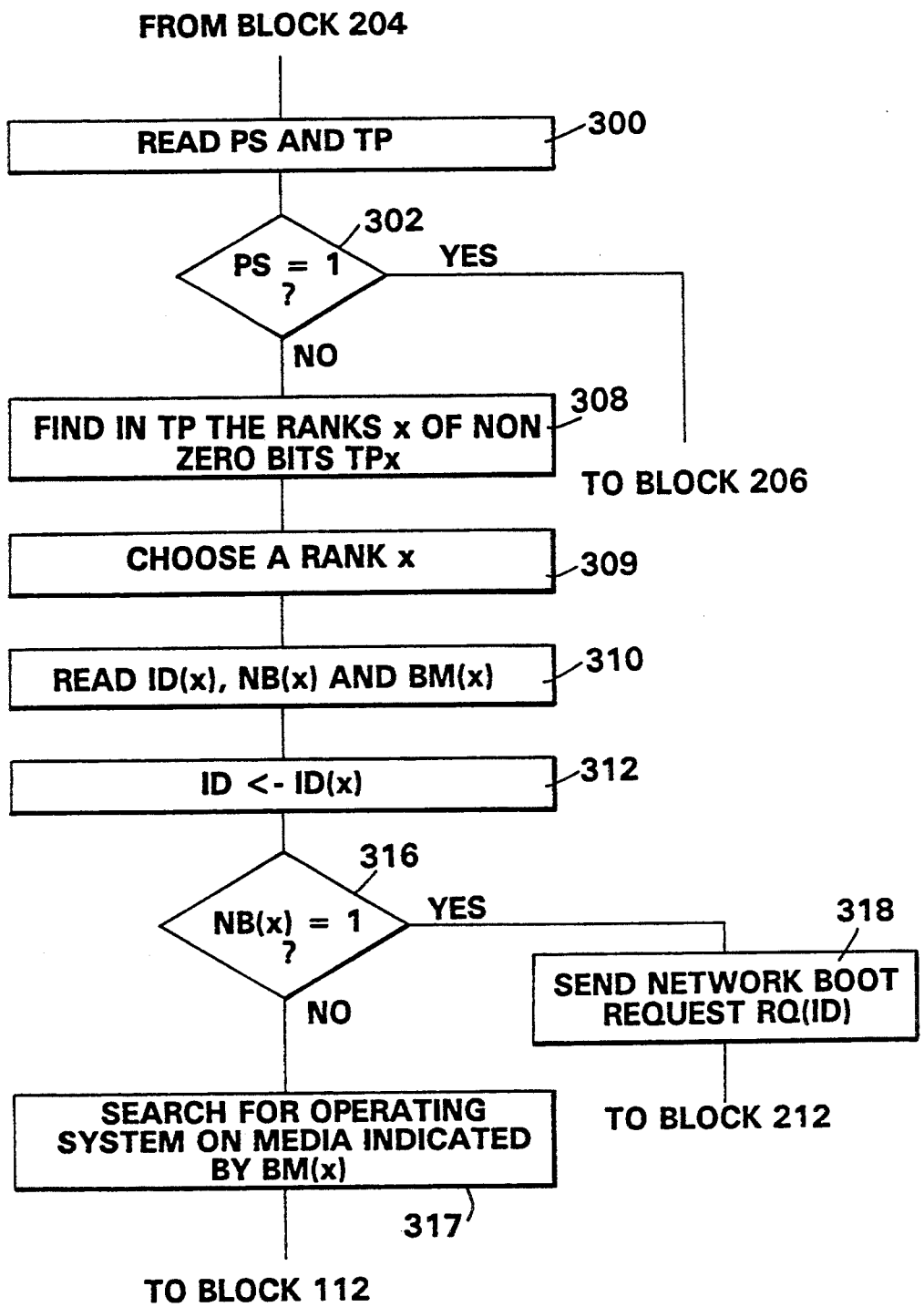
FIG. 5 is a flow-chart of operations carried out by a test program modified according to the invention.

FIG. 5 shows a flow-chart of the last operations carried out by a short POST modified according to the invention. This modified short POST is executed instead of the conventional short POST at block 110 of FIG. 2, following any boot-up (warm boot, cold boot, following the transition to a non zero value of the content of register TP).

In the modified short POST, the conventional operations corresponding to blocks 200–204 of FIG. 3 are first executed.

300. The power switch bit PS and the task pending register TP are read.

302. It is checked whether bit PS is set. The question is to know whether the microcomputer has been manually powered-on (due to an action on push-button K). If the microcomputer has been manually powered-on, boot-up is conventionally done from block 206 where the operating system loading is routed to a local media or to the network. Then, the user finds, as will be described later, his usual environment defined by the default startup file (ID=0).

308. Powering-on is not manual. The microcomputer is being booted because at least one programmed task is pending. The ranks of all the non zero bits of register TP are searched.

309. Among the non zero bits of register TP, one ($TP_x$) is selected according to a chosen priority order, for example, the one corresponding to the earliest programmed time (PT(x)). The rank x of the selected bit corresponds to the task number.

310. Startup file number register ID(x), the network boot bit NB(x), and the boot media identification bit BM(x), all specific to task x, are read.

312. Number ID(x) is written in current startup file number register ID.

316. It is checked whether the network boot bit NB(x) is set. The question is to know whether the operating system should be loaded through the network.

317. The operating system should not be loaded through the network. The operating system is searched on a local media (hard disc or floppy disc) indicated by bit BM(x), and the process is continued by the loading of the operating system in block 112.

As will be described hereinafter, the startup file associated with number ID(x) will then be executed.

318. The operating system should be loaded through the network. A load request RQ is sent through the network, which passes as a parameter the conventional MAC address as well as the current startup file number ID (here equal to ID(x)).

The server's network control program is adapted, according to the invention, to provide the microcomputer, in response to this request, with an operating system and a startup file both associated with the number ID received. The process continues at block 212 of FIG. 3 by waiting for the provision of the operating system through the network.

The operations executed according to the invention by the modified short POST correspond to a first phase of the method according to the invention. The second and last phase is ensured by the startup files themselves. The operations executed by the startup files are different depending on whether the operating system is locally loaded or loaded through the network.

Figure 6A:
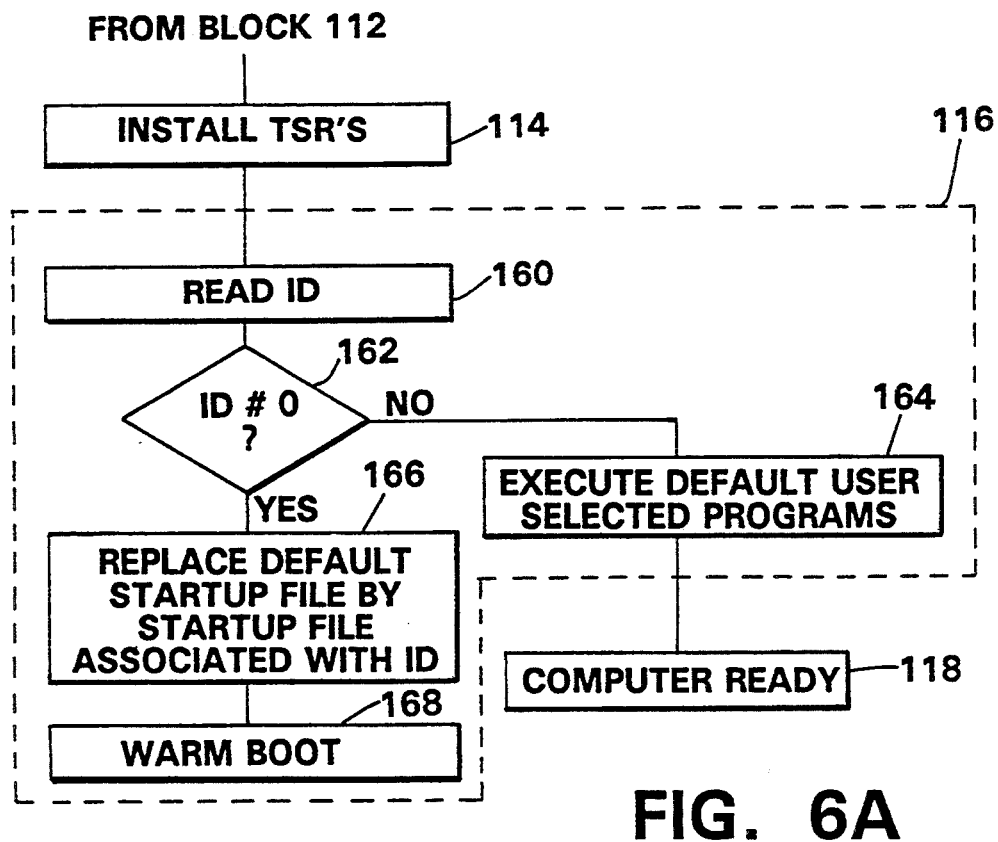
FIGS. 6A and 6B are flow-charts of the execution of local startup files according to the invention.
Figure 6B:
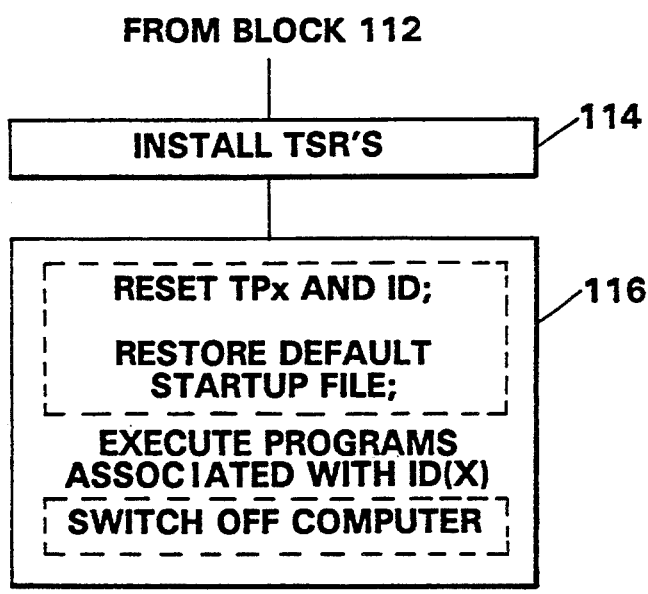

FIGS. 6A and 6B are flow-charts of operations executed by local startup files.

FIG. 6A is a flow-chart of operations carried out by a default local startup file. The default startup file is the file that has to be normally executed when the microcomputer is warm or cold booted by a user. The flow-chart includes the conventional blocks 114 for loading TSR's and 116 for executing programs. However, among the programs to be executed, there is provided a specific program carrying out operations corresponding to blocks 160, 162, 166 and 168.

160. The current startup file number register ID is read.

162. It is checked whether number ID is non zero. The question is to know whether a task is pending. It is reminded that in block 312 of FIG. 5, number ID is a non-default startup file number if the microcomputer is booted while a task is pending (at least one of the bits of register TP is set).

168. A task is not pending. A normal boot-up caused by a user is occurring. The selected default programs are executed.

118. The microcomputer is ready for use.

166. A task is pending. The current startup file is replaced on the load media by a startup file associated with number ID. Generally, the startup file to be executed has a specific name. For example, a DOS-operated system has two startup files named CONFIG.-SYS and AUTOEXEC.BAT. Thus, in order to replace the current startup file, it is sufficient to rename the latter and to give the specific name to the new selected startup file.

168. A warm boot of the microcomputer is caused, which can be conventionally achieved by a program instruction.

Then, the boot-up steps are carried out again from block 100 up to the local loading of the operating system in block 112, passing through blocks 300–317. The startup file which is then executed is the new current file associated with number ID.

FIG. 6B is a flow-chart of the operations carried out by such a startup file associated with a non zero number ID=ID(x).

114. The TSR's associated with number ID(x) are installed.

116. The listed programs to be launched are executed. In the list of programs to be launched are user-selected programs associated with number ID(x). At the beginning and end of the list, specific programs carry out the operations indicated within dashed line frames. These operations consist, at the beginning, in cancelling the current startup file number ID and the associated task pending bit $TP_x$, and restoring the local default startup file; and, at the end, switching the microcomputer off. In order to switch the microcomputer off, bit OFF is set through bus B. It is reminded that bit OFF is volatile, that is, it is reset as soon as the write signal on bus B disappears, for example, when the microcomputer is switched off. This ensures that the microcomputer does not stay blocked in its off state.

With the method according to the invention described up to now, a user can program as many pending tasks as bits present in register TP at times when the microcomputer is assumed to be switched off, for example, at night. Thus, tedious tasks such as hard disc back-ups or checking for viruses can be carried out as often as necessary without disturbing the user. As described hereinafter, network loading of the operating system has additional advantages.

Figure 7:
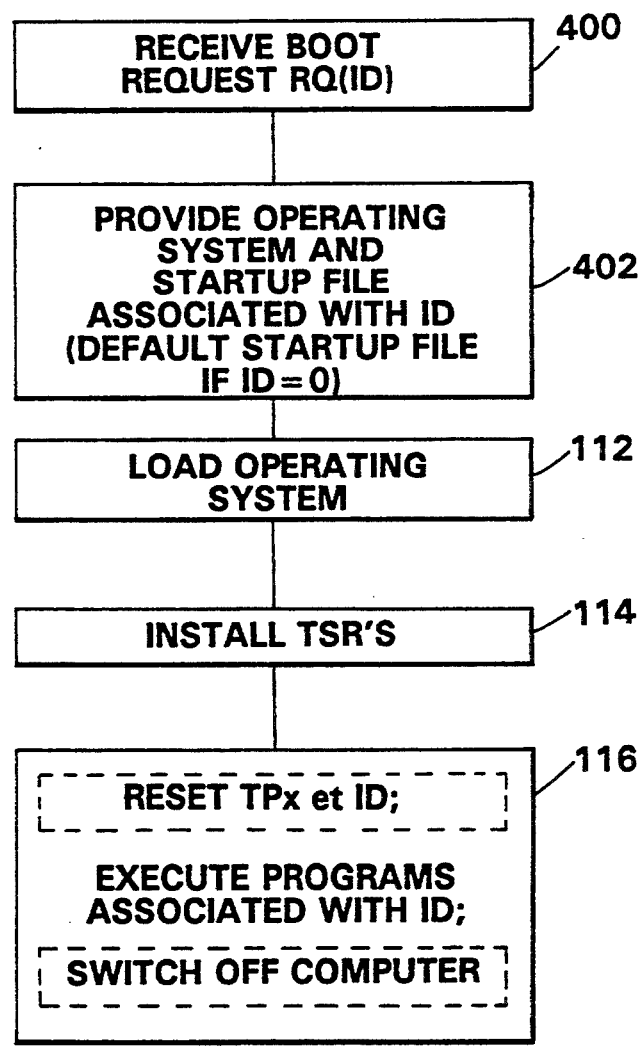
FIG. 7 is a flow-chart of a network boot process according to the invention.

FIG. 7 is a flow-chart of operations carried out during a network boot according to the invention.

400. The server receives the boot request RQ sent by the microcomputer in block 318 of FIG. 5 or in block 210 of FIG. 3. The boot request sent in block 318 passes as a parameter the MAC address of the microcomputer as well as a startup file number ID. The request sent in block 210 passes as a parameter the MAC address only. It can then be assumed that the startup file number ID is zero (corresponds to a default startup file).

402. The server provides the microcomputer with the operating system and the startup file, both associated with number ID.

112. The microcomputer conventionally loads the provided operating system.

114. The TSR's listed in the startup file provided by the server are conventionally loaded.

116. The programs to be launched listed in the provided startup file are executed. In the list of programs to be launched are user-selected programs and, at the beginning and the end of the list, specific programs executing the operations in dashed line frames in FIG. 7. These operations consist, at the beginning, in cancelling number ID and the associated task pending bit $TP_x$; and, at the end, switching the microcomputer off. Of course, if the startup file is the default file (ID=0), the latter does not include the programs executing the operations in dashed line frames.

A specialist in charge of the network, or a network administrator, can periodically modify an upgrade startup file in which are listed programs which do the updating of data or of software on the hard disc of a microcomputer that would execute this upgrade startup file. Thus, if a user programs the execution of the upgrade file at periodic time intervals, his data and software are automatically updated. This avoids tedious updating operations that the network administrator would have to do for each microcomputer.

If a programmed task is interrupted, for example because of current failure, the associated bit $TP_x$ is not modified. Thus, as soon as the current is restored, the set state of bit $TP_x$ is detected again by the control circuit 44 that powers-on the microcomputer again. In case of local booting, the current startup file is still the file corresponding to the interrupted task, and the file is executed again. In case of network booting, the server provides again the startup file associated with the task.

If several tasks are pending (several bits of register TP are set) a second task is executed after a first task as soon as the first task is completed and the microcomputer switched off.

If a task is pending at a time when the microcomputer is on, the corresponding bit $TP_x$ is set but has no effect as long as the microcomputer is on. As soon as the microcomputer is switched off, the control circuit 44 detects the set state of bit $TP_x$ and powers-on the microcomputer again in order to execute the task.

If the user wants to use the microcomputer when a programmed task is being executed, he will activate the power switch three times. A first action causes bit PS to be set, which has no effect since the microcomputer is already on. The second action causes bit PS to be reset, which switches the microcomputer off. The third action causes bit PS to be set again, thus causing a manual power-on, and therefore a conventional boot (the process goes through blocks 302 and 206 of FIG. 5). Of course the third action on the switch has to occur before the control circuit detects a pending task (a bit $TP_x$ that is set). For this purpose, the detection of pending tasks has to be inhibited for a lapse of time long enough to enable the user to carry out this third action.

Several additional registers or bits can be provided in the common register set 40 or specific sets 42. More particularly, according to an embodiment of the invention, a register storing a minimum time delay that has to elapse between the switching off of the microcomputer and a detection of a new programmed task is provided in the common register set 40.

According to another embodiment, there is provided, for each task, a bit whose state determines whether the task can be interrupted or not by an action on the power switch.

According to another embodiment, there is provided a bit indicating that the keyboard should be locked when a programmed task is being executed so as to not unduly impair it by acting on the keyboard.

According to another embodiment, there is provided a register, in which a programmed time is stored for switching the microcomputer OFF. The control circuit 44, when the programmed time is reached, briefly sets bit OFF, which causes the microcomputer to be switched off and bit PS to be reset. Such a register enables, when a user forgets to switch the microcomputer off, to still execute the pending tasks.

According to another embodiment a time-out bit is provided for a programmed task, that must be set before a predetermined time (stored in an additional register) has elapsed from the microcomputer's boot-up. If the time-out bit is not set before the time delay has elapsed, the control circuit 44 switches the microcomputer off and resets the associated bit $TP_x$. This time-out bit enables to detect whether the task was blocked while being executed and to still execute subsequent tasks.

Various other applications of the invention can be devised. A user can program the daily powering-on of the microcomputer and execution of a program at a time before his arrival. This avoids tedious waiting during boot-up operations.

The additional circuits (registers 40, 42, circuit 44) of the invention are built about an existing RTC/CMOS memory circuit. Of course, the circuits can be separately built, provided that they are permanently powered.

As is apparent to those skilled in the art, various modifications can be made to the above disclosed embodiments. In particular, the various flow-charts are given by way of example; they can obviously be modified or optimized without departing from the spirit of the invention. Similarly, these flow-charts can use the described registers or other registers in a different way in order to provide the same results.

The writing of the programs corresponding to the various flow-charts can be achieved by any programmer.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

I claim:

1. A booting method for a microcomputer involving executing a test program, loading an operating system to establish an operating environment, and utilizing at least one startup file to tailor that environment, the method comprising the following steps:
   (a) storing in a non-volatile store, for each of a plurality of tasks to be executed, a startup file identifier identifying at least one startup file to be used for that task;
   (b) storing in a non-volatile store, accessible through a bus of the microcomputer, respective programmed times associated with said plurality of tasks to be executed;
   (c) detecting the coincidence between the time indicated by a permanently powered clock and a said programmed time, and storing for the associated task an indication that it is now a pending task, and
   (d) as a consequence of detecting said coincidence in step (c), powering on the microcomputer, running said test program, loading said operating system and tailoring the operating environment established thereby utilizing said at least one startup file associated with the task, which task, according to said indication, is a pending task.

2. The booting method of claim 1, wherein:
   in step (c), the storing of said indication that said task is now a pending task involves setting a non-volatile task pending bit, accessible through said bus, into an active state;
   in step (d), monitoring said task pending bit and upon this bit being set into its active state, powering on the microcomputer; and
   resetting said task pending bit out of its active state as soon as the task concerned is completed.

3. The booting method of claim 1, wherein step (d) involves:
   loading said operating system from a storage local medium and using one predetermined startup file to tailor the operating system environment;
   replacing, on the local medium, said one predetermined startup file with said at least one startup file identified by said startup file identifier;
   booting the microcomputer system again, whereby the said at least one startup file identified by said startup file identifier is executed; and
   restoring said one predetermined startup file.

4. The booting method of claim 3, wherein said test program involves checking whether the microcomputer has been manually powered on and;
   in the event that the microcomputer has been manually powered on, loading said operating system and using a default startup file to tailor the operating system environment;
   otherwise, proceeding with the execution of step (d).

5. The booting method of claim 1, further comprising the step of storing for each said task in a respective non-volatile network boot bit accessible through said bus, a value indicating whether, for said task, the operating system should be loaded through the network; step (d) involving, following power on of the microcomputer, checking the said network bit for the said pending task, and:

if the network boot bit is set, sending through the network a load request, passing as a parameter the startup file identifier associated with said pending task, a server then providing the microcomputer with an operating system and said at least one startup file identified by said startup file identifier;

if the network boot bit is not set:

loading an operating system from a local storage medium and using one predetermined startup file to tailor the operating system environment;

replacing, one the local medium, said predetermined startup file with said at least one startup file identified by said startup file identifier;

booting the microcomputer system again, whereby the said at least one startup file identified by said startup file identifier is executed; and restoring said one predetermined startup file.

6. The booting method of claim 5, wherein said test program involves checking whether the microcomputer has been manually powered on and;

in the event that the microcomputer has been manually powered on, loading said operating system and using a default startup file to tailor the operating system environment;

otherwise, proceeding with the execution of step (d).

7. The booting method of claim 1, wherein said test program involves checking whether the microcomputer has been manually powered on and;

in the event that the microcomputer has been manually powered on, loading said operating system and using a default startup file to tailor the operating system environment;

otherwise, proceeding with the execution of step (d).

8. The booting method of claim 1, wherein the following steps are carried out by said at least one startup file associated with at least one of said tasks,:

executing specified programs to effect said pending task; and removing said indication that said task just effected is a pending task.

* * * * *